US011305717B2

(12) United States Patent
Shrivatri et al.

(10) Patent No.: US 11,305,717 B2
(45) Date of Patent: Apr. 19, 2022

(54) KNEE PROTECTION AIRBAG APPARATUS

(71) Applicant: TOYODA GOSEI CO., LTD., Kiyosu (JP)

(72) Inventors: Aviral Shrivatri, Madison Heights, MI (US); Shiro Ohara, W Bloomfield, MI (US); Eugene Lee, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 43 days.

(21) Appl. No.: 16/773,245

(22) Filed: Jan. 27, 2020

(65) Prior Publication Data

US 2021/0229616 A1    Jul. 29, 2021

(51) Int. Cl.
*B60R 21/206* (2011.01)
*B60R 21/2338* (2011.01)
*B60R 21/231* (2011.01)
*B60R 21/233* (2006.01)
*B60R 21/00* (2006.01)

(52) U.S. Cl.
CPC .......... *B60R 21/206* (2013.01); *B60R 21/231* (2013.01); *B60R 21/233* (2013.01); *B60R 21/2338* (2013.01); *B60R 2021/0046* (2013.01); *B60R 2021/0051* (2013.01); *B60R 2021/0053* (2013.01); *B60R 2021/23169* (2013.01); *B60R 2021/23176* (2013.01); *B60R 2021/23308* (2013.01); *B60R 2021/23386* (2013.01)

(58) Field of Classification Search
CPC . B60R 21/206; B60R 21/2338; B60R 21/231; B60R 21/205; B60R 21/233; B60R 2021/23386; B60R 2021/0051; B60R 2021/23169; B60R 2021/0046; B60R 2021/23176; B60R 2021/0053; B60R 2021/23308
USPC ................ 280/730.1, 729, 743.2, 732, 743.1
See application file for complete search history.

(56) References Cited

U.S. PATENT DOCUMENTS

| | | | |
|---|---|---|---|
| 6,217,059 B1 * | 4/2001 | Brown | B60R 21/16 280/730.1 |
| 2004/0113399 A1 * | 6/2004 | Yoshikawa | B60R 21/206 280/730.1 |

(Continued)

FOREIGN PATENT DOCUMENTS

| | | | | |
|---|---|---|---|---|
| CN | 110182162 A | * | 8/2019 | ....... B60R 21/23138 |
| EP | 1431131 A1 | * | 6/2004 | ........... B60R 21/206 |

(Continued)

*Primary Examiner* — Keith J Frisby
(74) *Attorney, Agent, or Firm* — Posz Law Group, PLC

(57) ABSTRACT

A knee airbag apparatus includes an airbag that is configured to be accommodated in a holder arranged in an instrument panel of a vehicle. The airbag includes an upper inflation portion and a lower inflation portion. The upper inflation portion is configured to be deployed and inflated from the holder along a rear surface of the instrument panel in a rear upward direction to protect a knee of a lea of the occupant. The lower inflation portion is configured to be deployed and inflated from the holder in a downward direction or a diagonally rear downward direction such that a lower end of the lower inflation portion reaches a position where the lower end contacts an instep of a foot of the leg of the occupant or a position lower than the instep to protect the foot of the occupant.

7 Claims, 10 Drawing Sheets

(56) References Cited

U.S. PATENT DOCUMENTS

| | | | | |
|---|---|---|---|---|
| 2015/0061268 A1* | 3/2015 | Nagasawa | ............ | B60R 21/231 |
| | | | | 280/730.1 |
| 2018/0345899 A1* | 12/2018 | Munsee | ............... | B60R 21/239 |
| 2020/0130632 A1* | 4/2020 | Sekizuka | ............. | B60R 21/231 |
| 2020/0164827 A1* | 5/2020 | Oh | ....................... | B60R 21/239 |

FOREIGN PATENT DOCUMENTS

| | | | | |
|---|---|---|---|---|
| JP | 2004168280 | A | * | 6/2004 |
| JP | 2004175150 | A | * | 6/2004 |
| JP | 2018-016083 | A | | 2/2018 |
| JP | 2018-062212 | A | | 4/2018 |
| KR | 20150118060 | A | * | 10/2015 |

\* cited by examiner

KNEE PROTECTION AIRBAG APPARATUS

BACKGROUND

1. Field

The following description relates to a knee protection airbag apparatus that protects the knees of an occupant when an impact is applied to the vehicle from a frontward direction or a diagonally frontward direction.

2. Description of Related Art

When an impact is applied to a vehicle from a frontward direction or a diagonally frontward direction thereby slowing or stopping the vehicle, inertia will act to force the entire body of the occupant in the direction in which the impact was applied. A knee protection airbag apparatus is effective for protecting the knees of the occupant. Such type of an airbag apparatus includes an airbag and a gas generator. The airbag is accommodated in a holder located in front of the knees, and the gas generator is arranged in the airbag.

When a frontal impact or a diagonally frontal impact is applied to or predicted to be applied to a vehicle equipped with the knee protection airbag apparatus, inflation gas will be generated from the gas generator. The inflation gas deploys and inflates the airbag in front of the knees of the occupant with part of the airbag remaining in the holder. The airbag restrains the knees that are forced in the frontward direction or diagonally frontward direction and protects the knees from the impact.

A typical example of a knee protection airbag apparatus for protecting an occupant seated in a front seat is arranged in an instrument panel located in front of a front seat (for example, refer to Japanese Laid-Open Patent Publication No. 2018-16083). The airbag includes a main body and a central projection. The main body is deployed and inflated from the holder along a rear surface of the instrument panel a rear upward direction to protect the knees of the occupant. The central projection is deployed and inflated toward the shins of the occupant from a central part, with respect to the transverse direction of the vehicle, of a lower portion of the main body. The central projection restrains the shins that are forced in the diagonally frontward direction and protects the shins from an impact.

In the knee protection airbag apparatus described above, the central projection restrains and protects the shins of the occupant. However, it is difficult for the central projection to restrain and protect the feet, which are lower than the shins, when the feet are forced in the frontward direction or diagonally frontward direction.

SUMMARY

It is an objective of the present invention to provide a knee protection airbag apparatus that protects the feet, in addition to the knees, of an occupant seated in a front seat of a vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a knee protection airbag apparatus includes an airbag configured to be accommodated in a holder arranged in an instrument panel of a vehicle. The knee protection airbag apparatus is configured to deploy and inflate the airbag with inflation gas between the holder and a leg of an occupant seated in a front seat of the vehicle. The airbag includes an upper inflation portion configured to be deployed and inflated from the holder along a rear surface of the instrument panel in a rear upward direction to protect a knee of the leg of the occupant and a lower inflation portion configured to be deployed and inflated from the holder in a downward direction or a diagonally rear downward direction such that a lower end of the lower inflation portion reaches a position where the lower end contacts an instep of a foot of the leg of the occupant or a position lower than the instep to protect the foot of the occupant.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A knee protection airbag apparatus in accordance with a first embodiment will now be described with reference to FIGS. 1 and 2.

In the following description, the direction in which the vehicle travels (forward traveling direction) will be referred to as frontward, and the rearward traveling direction will be referred to as rearward. The height direction of the vehicle will be referred to as the vertical direction. The frame of reference for a transverse direction (lateral direction) of the vehicle will be a view taken from the rear of the vehicle.

Figure 1:
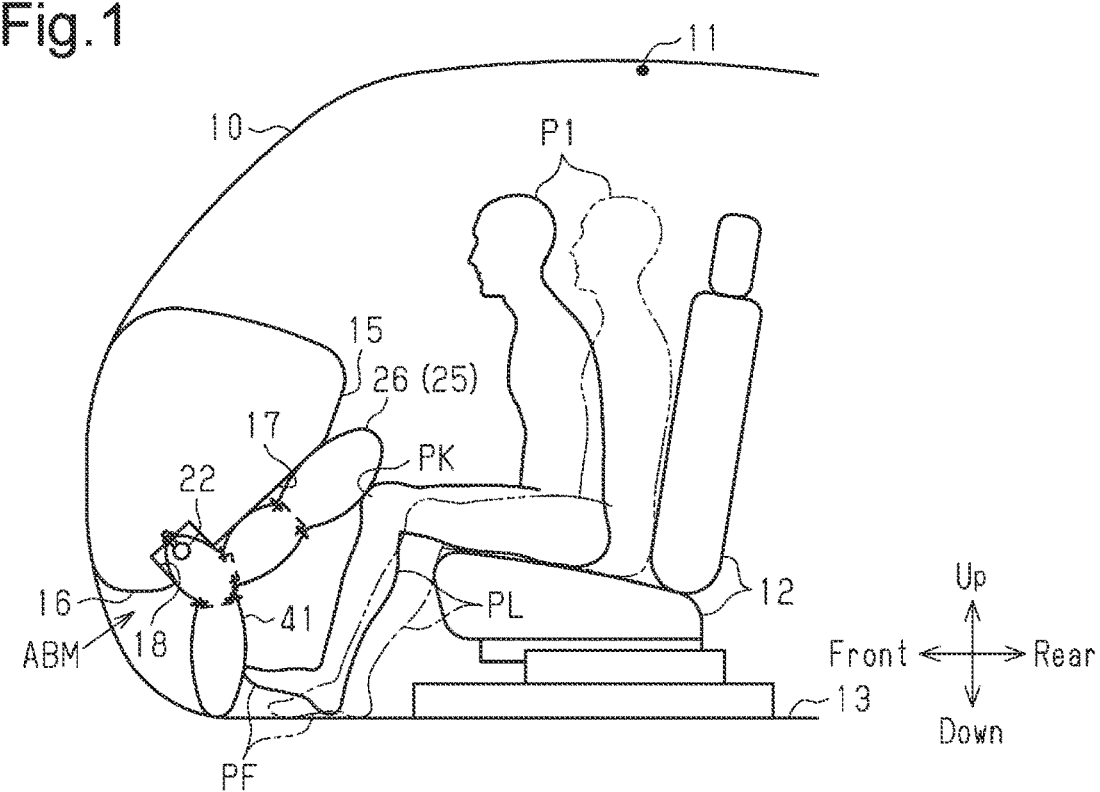
FIG. 1 is a partially cross-sectional side view illustrating how the knees and feet of an occupant are protected from an impact by a knee protection airbag apparatus in accordance with a first embodiment.
Figure 2:
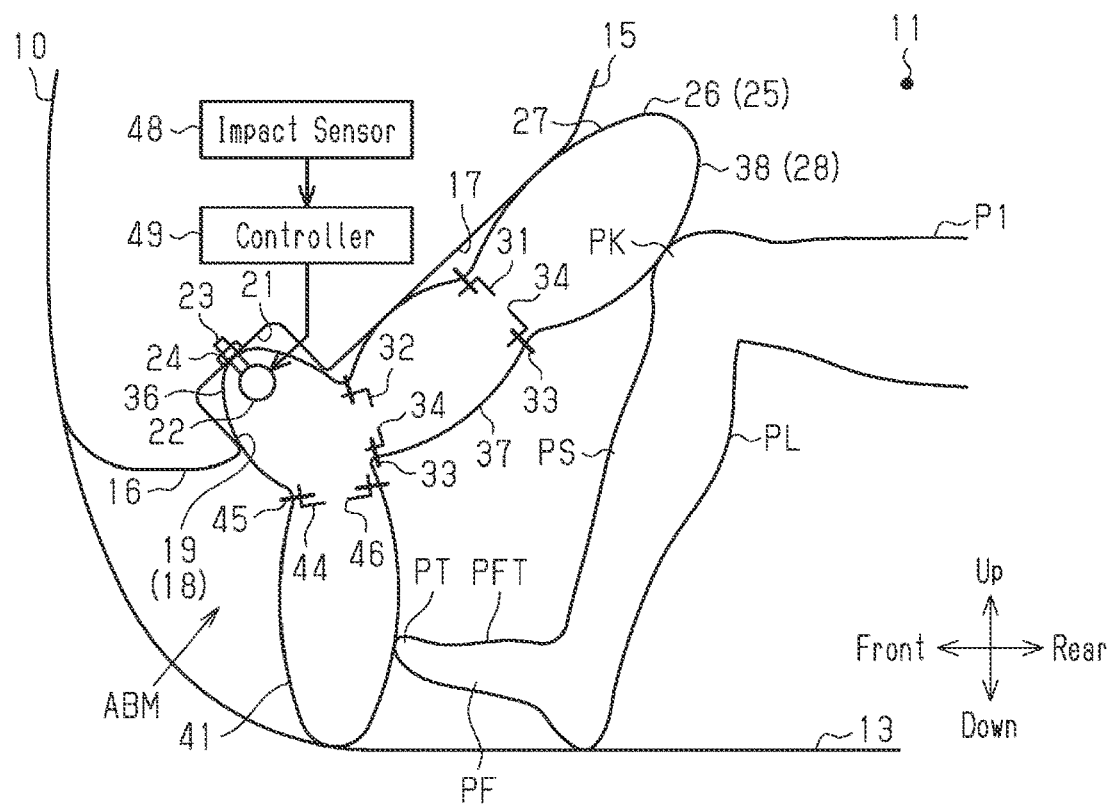
FIG. 2 is a partially cross-sectional side view showing part of FIG. 1.

FIG. 1 schematically shows the structure of a front part of a passenger compartment 11 in a vehicle 10. As shown in FIG. 1, a vehicle seat 12, which serves as a front seat, is arranged in the passenger compartment 11. An occupant P1, shown by the double lines and having the same body build as a crash test dummy, is seated in the vehicle seat 12. The occupant P1 is restrained to the vehicle seat 12 by a seat belt apparatus (not shown).

An instrument panel 15 is arranged in front of the vehicle seat 12 in the passenger compartment 11. As shown in FIGS. 1 and 2, the instrument panel 15 includes a bottom portion 16 located above the floor 13 of the passenger compartment 11. The rear of the instrument panel 15 next to the upper side of the bottom portion 16 is an inclined portion 17. The inclined portion 17 is inclined so as to be higher at rearward positions. A holder 18 is arranged in the lower part of the inclined portion 17 at the boundary with the bottom portion 16. The holder 18 includes an opening 19 that opens in a diagonally rear downward direction. The opening 19 is closed by a cover (not shown).

The holder 18 accommodates an airbag module ABM that forms the main part of the knee protection airbag apparatus. The airbag module ABM includes as its main components a gas generator 22 and an airbag 25.

The airbag 25 is formed by a fabric such as a woven cloth or a non-woven cloth that can be easily folded and has high strength and flexibility. The fabric may be formed by polyester threads or polyamide threads. Although not shown in the drawings, the airbag 25 is accommodated in the holder 18 in a folded state. The gas generator 22 is arranged in the airbag 25 to generate inflation gas supplied to the airbag 25. Bolts 23 are fixed to the gas generator 22 and inserted through the airbag 25 and a bottom wall 21 of the holder 18. Nuts 24 are fastened to the bolts 23 to fix the gas generator 22 and the airbag 25 to the holder 18.

The airbag 25 includes an upper inflation portion 26, deployed and inflated from the holder 18 in a rear upward direction along the rear surface of the instrument panel 15, and a lower inflation portion 41, deployed and inflated from the holder 18 in a substantially downward direction.

The upper inflation portion 26 protects the legs PL, mainly, the knees PK, of an occupant P1. When deployment and inflation of the airbag 25 are completed, the lower end of the upper inflation portion 26 will be spaced apart from and located in front of the shins PS of the occupant P1, and the upper end of the upper inflation portion 26 will be located upward from the knees PK.

In a state in which deployment and inflation of the airbag 25 are completed, a portion of the fabric forming the upper inflation portion 26 disposed toward the front of the vehicle 10 is referred to as the front fabric portion 27, and a portion of the fabric forming the upper inflation portion 26 disposed toward the rear of the vehicle is referred to as the rear fabric portion 28. The front fabric portion 27 and the rear fabric portion 28 may be formed by a single sheet of fabric or multiple sheets of fabric. The peripheral parts of the front fabric portion 27 and the rear fabric portion 28 are joined with each other by a peripheral joining portion (not shown). The peripheral joining portion is formed by sewing the two peripheral parts of the front fabric portion 27 and the rear fabric portion 28 with sewing threads. Alternatively, the peripheral joining portion may be formed by, for example, adhering the two peripheral parts with an adhesive. The same applies to a peripheral joining portion of the lower inflation portion 41, which will be described later, and other joining portions 33, 45, 53. 55, 62, 69, 71, 73, 74, and 77.

The upper inflation portion 26 is partitioned into three chambers by two partitions 31 and 32. The two partitions 31 and 32 are formed from the same material as the front fabric portion 27 and the rear fabric portion 28 and have the same structure as a component generally referred to as a tether. The two partitions 31 and 32 are spaced apart from each other in the vertical direction and located between the front fabric portion 27 and the rear fabric portion 28. The two partitions 31 and 32 are formed to be elongated sideward so that the dimension in the transverse direction of the vehicle is larger than the dimension in the front-rear direction of the vehicle when straightly stretched out by inflation of the upper inflation portion 26. A joining portion 33 joins the peripheral portions of the partitions 31 and 32 with the front fabric portion 27 and the rear fabric portion 28. Thus, the partitions 31 and 32 extend between the front fabric portion 27 and the rear fabric portion 28.

The three chambers partitioned by the two partitions 31 and 32 are referred to as a coupling chamber 36 located frontward from the lower partition 32, a lower chamber 37 located between the two partitions 31 and 32, and an upper chamber 38 located upward from the upper partition 31. The gas generator 22 is arranged inside the coupling chamber 36.

The partition 32 includes a connection hole 34 that connects the coupling chamber 36 and the lower chamber 37. The partition 31 includes a connection hole 34 that connects the lower chamber 37 and the upper chamber 38.

The lower inflation portion 41 protects the legs PL, mainly, the feet PF, of the occupant P1. The lower inflation portion 41 is connected to the coupling chamber 36, which forms a lower part of the upper inflation portion 26. When deployment and inflation of the airbag 25 are completed, the upper end of the lower inflation portion 41 will be spaced apart from and located in front of the shins PS of the occupant P1, and the lower end of the lower inflation portion 41 will be located at a position lower than the insteps PFT of the feet PF. In the first embodiment, the lower end of the lower inflation portion 41 is located at a position where it contacts and presses the floor 13 of the passenger compartment 11 from above.

A partition 44 is located at the border between the coupling chamber 36 and the lower inflation portion 41 to partition the coupling chamber 36 and the lower inflation portion 41. The partition 44 is formed to be elongated sideward so that the dimension in the transverse direction of the vehicle is larger than the dimension in the front-rear direction of the vehicle when straightly stretched out by deployment and inflation of the airbag 25.

A joining portion 45 joins the peripheral portion of the partition 44 with the bordering part of the lower inflation portion 41 and the coupling chamber 36. The partition 44 includes a connection hole 46 that connects the coupling chamber 36 and the lower inflation portion 41.

The knee protection airbag apparatus includes an impact sensor 48 and a controller 49 in addition to the airbag module ABM. The impact sensor 48 includes an acceleration sensor or the like and detects an impact applied to the vehicle 10 from the frontward direction or diagonally frontward direction. The controller 49 controls activation of the gas generator 22 based on a detection signal from the impact sensor 48.

Operation of the first embodiment, which is configured as described above, will now be described. Advantages resulting from the operation will also be described.

When the impact sensor 48 does not detect any impact applied from the frontward direction or diagonally frontward direction, the controller 49 does not output an activation signal for activating the gas generator 22 to the gas generator. Thus, the gas generator 22 does not discharge inflation gas. The airbag 25 remains accommodated in the holder 18 in a folded state.

When the vehicle 10 is slowed or stopped by an impact applied to the vehicle 10 from a frontward direction during a frontal collision or an impact applied to the vehicle 10 from a diagonally frontward direction during a diagonal collision or offset collision (small overlap collision), inertia will act to force the entire body of the occupant P1 in the direction in which the impact was applied as shown by the solid lines in FIG. 1. The impact is detected by the impact sensor 48 shown in FIG. 2. In response to a detection signal from the impact sensor 48, the controller 49 will output an activation signal to the gas generator 22. In response to the activation signal, the gas generator 22 will discharge inflation gas.

The inflation gas is supplied to the coupling chamber 36 in which the gas generator 22 is arranged. When supplied with the inflation gas, the coupling chamber 36 is unfolded, or deployed, and inflated. The coupling chamber 36 rips open the cover (not shown) and pops out of the holder 18 with part of the coupling chamber 36 left in the holder 18.

Some of the inflation gas supplied to the coupling chamber 36 flows through the connection hole 34 of the partition 32 into the lower chamber 37. Further, some of the inflation gas flows from the lower chamber 37 through the connection hole 34 of the partition 31 into the upper chamber 38.

Some of the inflation gas supplied to the coupling chamber 36 flows through the connection hole 46 of the partition 44 into the lower inflation portion 41.

The inflation gas supplied as described above deploys and inflates the upper inflation portion 26 sequentially from the coupling chamber 36, the lower chamber 37, and the upper chamber 38. The upper inflation portion 26 is deployed and inflated from the holder 18 along a rear surface of the instrument panel 15 in a diagonally rear upward direction. The deployment and inflation pulls the partitions 31 and 32 toward opposite sides in the front-rear direction. The partitions 31 and 32 are straightly stretched out to restrict the inflation thickness of the lower chamber 37 and the inflation thickness of the upper chamber 38 in the front-rear direction. In this manner, even though the gap is small between the instrument panel 15 and the knees PK, the upper inflation portion 26 is deployed and inflated between the instrument panel 15 and the knees PK.

The deployed and inflated upper inflation portion 26 contacts the rear surface of the instrument panel 15. This restricts movement of the upper inflation portion 26 in a frontward direction or a diagonally frontward direction. Thus, the upper inflation portion 26 restrains the knees PK that are forced in the frontward direction or diagonally frontward direction and protects the knees PK from an impact.

If the airbag 25 were to be without the lower inflation portion 41 and formed by only the upper inflation portion 26, the part of the legs PL lower than the knees PK, in particular, the feet PF, may be forced to slide and move in the frontward direction or diagonally frontward direction with the knees PK received by the upper inflation portion 26 serving as a fulcrum.

In the first embodiment including the lower inflation portion 41 in addition to the upper inflation portion 26, the supplied inflation gas deploys and inflates the lower inflation portion 41 in a substantially downward direction from the coupling chamber 36. The deployment and inflation occurs in front of the toes PT of the feet PF of the occupant P1. The lower inflation portion 41 is deployed and inflated so that the lower end of the lower inflation portion 41 reaches a position lower than the insteps PFT of the feet PF.

Thus, the lower inflation portion 41 restrains the feet PF that are forced toward the space between the bottom portion 16 of the instrument panel 15 and the floor 13 of the passenger compartment 11 in the frontward direction or diagonally frontward direction and protects the feet PF from an impact.

Additionally, the lower end of the lower inflation portion 41 contacts and presses the floor 13 of the passenger compartment 11. That is, the lower inflation portion 41 is pressed against the floor 13. The pressing produces friction between the lower inflation portion 41 and the floor 13 and limits movement of the lower inflation portion 41 in the frontward direction or diagonally frontward direction as compared with when the lower inflation portion 41 is not pressed against the floor 13. Accordingly, the lower inflation portion 41 increases the capability of the airbag 25 for restraining movement of the feet PF when forced in the frontward direction or diagonally frontward direction.

The upper inflation portion 26 is deployed and inflated in front of the knees PK, and the lower inflation portion 41 is deployed and inflated in front of the toes PT of the feet PF. This protects the knees PK and the feet PF regardless of whether the collision that occurs is a frontal collision, a diagonal collision, or an offset collision.

Second Embodiment

Figure 3:
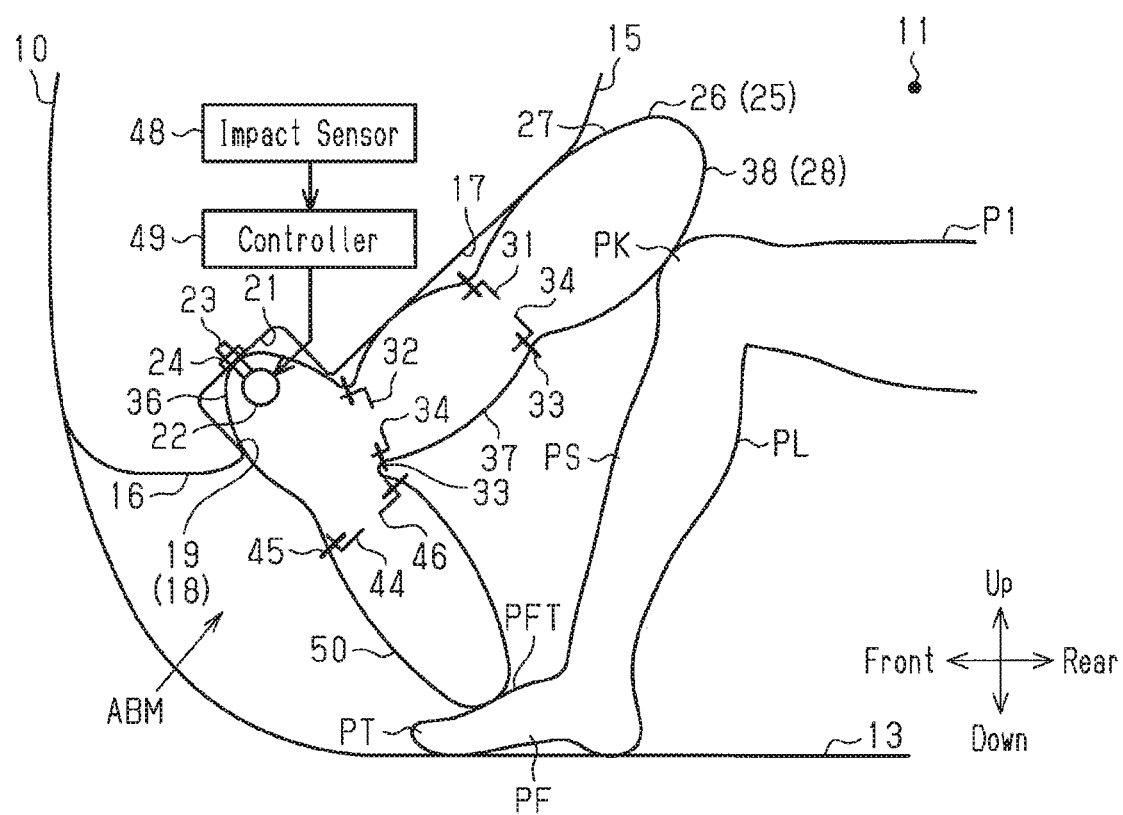
FIG. 3 is a partially cross-sectional side view showing a knee protection airbag apparatus in accordance with a second embodiment.

A knee protection airbag apparatus in accordance with a second embodiment will now be described with reference to FIG. 3.

The second embodiment differs from the first embodiment in that a lower inflation portion 50 is deployed and inflated in a diagonally rear downward direction. In the first embodiment, the lower inflation portion 41 is deployed and inflated in a downward direction.

Further, the second embodiment differs from the first embodiment in that the lower end of the lower inflation portion 50 presses and contacts the insteps PFT of the feet PF from the upper side. In the first embodiment, the lower end of the lower inflation portion 41 presses and contacts the floor 13 of the passenger compartment 11.

Otherwise, the structure of the second embodiment is the same as the first embodiment. Thus, like or the same reference numerals are given to those components that are the same as the corresponding components of the first embodiment. Such components will not be described in detail.

In the second embodiment, the inflation gas supplied via the coupling chamber 36 deploys and inflates the lower inflation portion 50 in a diagonally rear downward direction from the holder 18. The lower inflation portion 50 is deployed and inflated so that the lower end of the lower inflation portion 50 reaches a position where the lower end contacts the insteps PFT of the feet PF. The contact produces friction between the lower inflation portion 50 and the insteps PFT.

Thus, the lower inflation portion 50 restrains the feet PF that are forced toward the space between the bottom portion 16 of the instrument panel 15 and the floor 13 of the passenger compartment 11 in the frontward direction or diagonally frontward direction and protects the feet PF from an impact.

Additionally, the lower end of the lower inflation portion 50 contacts and presses the insteps PFT of the feet PF. In other words, the lower end of the lower inflation portion 50 is pressed against the insteps PFT. The pressing produces friction between the lower inflation portion 50 and the insteps PFT and limits movement of the feet PF as compared with when the insteps PFT are not pressed. This increases the capability of the airbag 25 for restraining movement of the feet PF when forced in the frontward direction as compared with when the lower inflation portion 50 simply contacts the insteps PFT.

The lower inflation portion 50 is pressed against the feet PF from the upper side. This protects the feet PF regardless of whether the collision that occurs is a frontal collision, a diagonal collision, or an offset collision.

Third Embodiment

Figure 4:
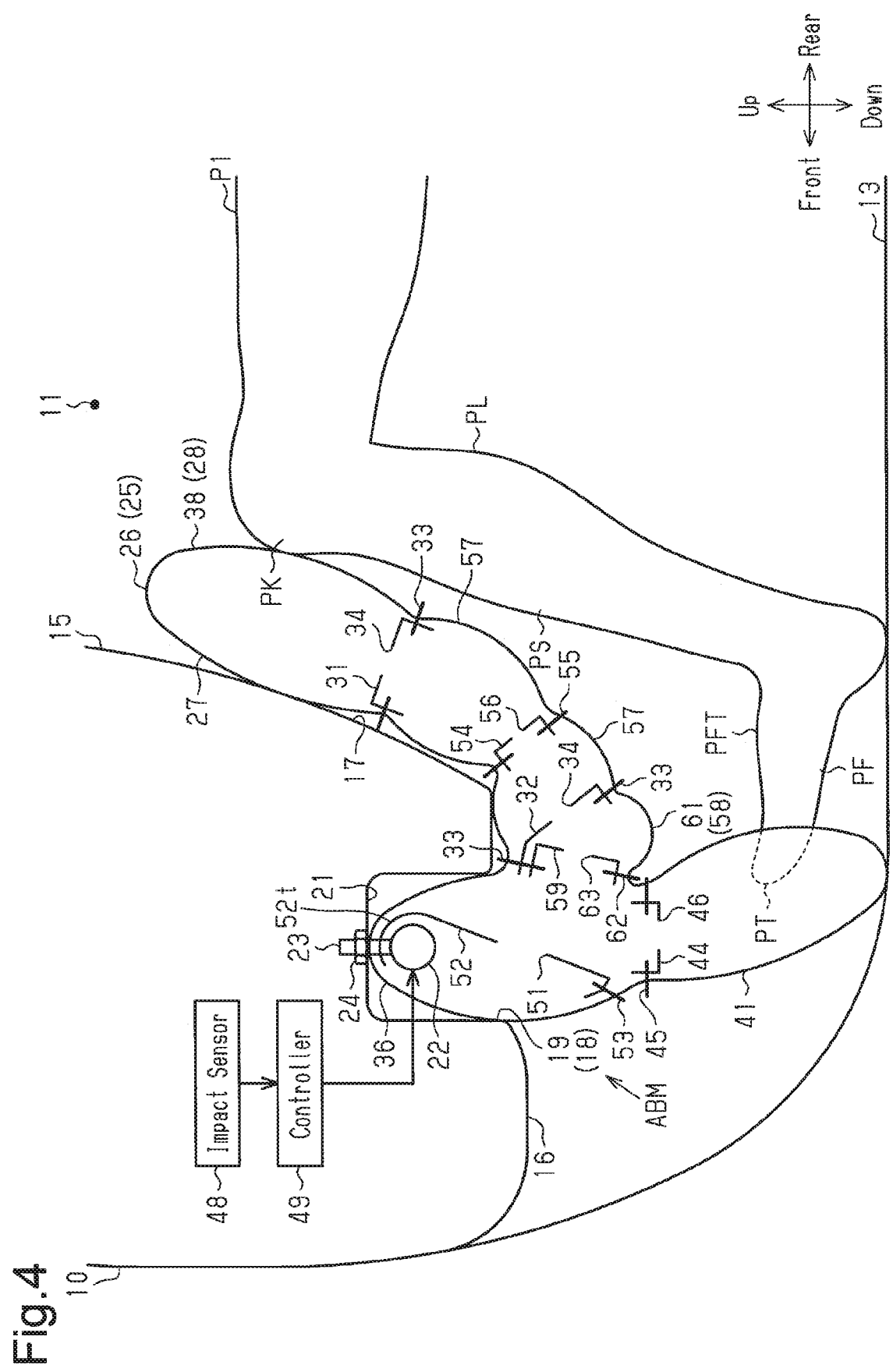
FIG. 4 is a partially cross-sectional side view showing a knee protection airbag apparatus in accordance with a third embodiment.

A knee protection airbag apparatus in accordance with a third embodiment will now be described with reference to FIG. 4.

The third embodiment differs from the first embodiment in that the holder 18 is arranged in the bottom portion 16 of the instrument panel 15. In the first embodiment, the holder 18 is arranged in the inclined portion 17. The opening 19 of the holder 18 opens in a downward direction. The opening 19 is closed by a cover (not shown) in the same manner as the first embodiment.

In the third embodiment, the structure of the lower part of the upper inflation portion 26 differs from that of the first embodiment.

An inner tether 52 is arranged in the coupling chamber 36 to restrict the inflation thickness of the coupling chamber 36 in the vertical direction. A joining portion 53 joins the lower peripheral portion of the inner tether 52 with the coupling chamber 36. The inner tether 52 includes an upper portion 52t held by the bolts 23. The bolts 23 are inserted through the upper portion 52t to hold the upper portion 52t. The inner tether 52 includes a connection hole 51 that connects the space at the front side of the inner tether 52 with the space at the rear side of the inner tether 52.

A partition 54 is arranged between the two partitions 31 and 32 in the upper inflation portion 26. A joining portion 55 joins the peripheral portion of the partition 54 with the front fabric portion 27 and the rear fabric portion 28. Thus, the partition 54 extends between the front fabric portion 27 and the rear fabric portion 28. The partition 54 forms an intermediate chamber 57 between the lower chamber 37 and the upper chamber 38. The partition 54 includes a connection hole 56 that connects the lower chamber 37 and the intermediate chamber 57.

An auxiliary chamber 58 is formed between the coupling chamber 36 and the lower chamber 37. The auxiliary chamber 58 acts to first deploy and inflate the upper inflation portion 26 from the opening 19 of the holder 18 in the downward direction and then along a rear surface of the instrument panel 15 in a diagonally rear upward direction.

A partition 59 is arranged in the upper inflation portion 26 at the upstream side of the partition 32 with respect to the direction in Which inflation gas flows to form the auxiliary chamber 58. The joining portion 33, which joins the front peripheral portion of the partition 32 with the front fabric portion 27, is used to join the upper peripheral portion of the partition 59 with the front fabric portion 27. The joining portion 33 joins the upper peripheral portion of the partition 59 and the front peripheral portion of the partition 32, which are overlapped with each other, with the front fabric portion 27.

The rear fabric portion 28 includes an expanded portion 61 located at the upstream side of where the partition 32 is joined with the joining portion 33 with respect to the direction in which inflation gas flows. The joining portion 33 joins the rear peripheral portion of the partition 32 with the rear peripheral portion of the expanded portion 61. The joining portion 62 joins the lower peripheral portion of the partition 59 with the front peripheral portion of the expanded portion 61. The partition 59 includes a connection hole 63 that connects the coupling chamber 36 and the auxiliary chamber 58.

Otherwise, the structure of the third embodiment is the same as the first embodiment. Thus, like or the same reference numerals are given to those components that are the same as the corresponding components of the first embodiment. Such components will not be described in detail.

Accordingly, the lower inflation portion 41 is deployed and inflated in a downward direction from the coupling chamber 36 in front of the toes PT until contacting and pressing the floor 13. This protects the feet PF from an impact.

In the third embodiment, the opening 19 of the holder 18 opens in the downward direction. Thus, when the upper inflation portion 26 is initially inflated, the upper inflation portion 26 projects out of the holder 18 in a downward direction. This may cause a large proportion of the coupling chamber 36 to project downward from the opening 19 when inflated unless there is a means for restricting the outer shape of the coupling chamber 36.

In this regard, in the third embodiment, the deployment and inflation of the coupling chamber 36 pulls and stretches the inner tether 52 in a substantially downward direction. The inner tether 52 restricts the inflation thickness of the coupling chamber 36 in the vertical direction. This avoids excessively thick deployment and inflation of the coupling chamber 36 in the downward direction. As a result, inflation gas quickly flows toward the upper inflation portion 26 and quickly deploys and inflates the upper inflation portion 26 thereby protecting the knees PK of the occupant P1 from an impact.

The auxiliary chamber 58 increases the length of the rear fabric portion 28 from the front fabric portion 27 by an amount corresponding to the expanded portion 61. The upper inflation portion 26 is bent in the upper frontward direction from where the joining portion 33 joins the upper peripheral portion of the partition 59 and the front peripheral portion of the partition 32, which are overlapped with each other, with the front fabric portion 27. Thus, the upper inflation portion 26 is first deployed and inflated from the opening 19 of the holder 18 in the downward direction and then along a rear surface of the instrument panel 15 in a diagonally rear upward direction.

In this manner, the third embodiment increases the capability for protecting the knees PK from an impact with the upper inflation portion 26.

Fourth Embodiment

A knee protection airbag apparatus in accordance with a fourth embodiment will now be described with reference to FIGS. 5 and 6.

In the fourth embodiment, the lower inflation portion 64 includes a lower end defining a section 64a that is deployed and inflated at a position adjacent to one foot PF in the transverse direction of the vehicle. The lower inflation portion 64 also includes a section 64b that contacts and presses the instep PFT of the foot PF at a position located adjacent to the upper side of the section 64a.

Figure 5:
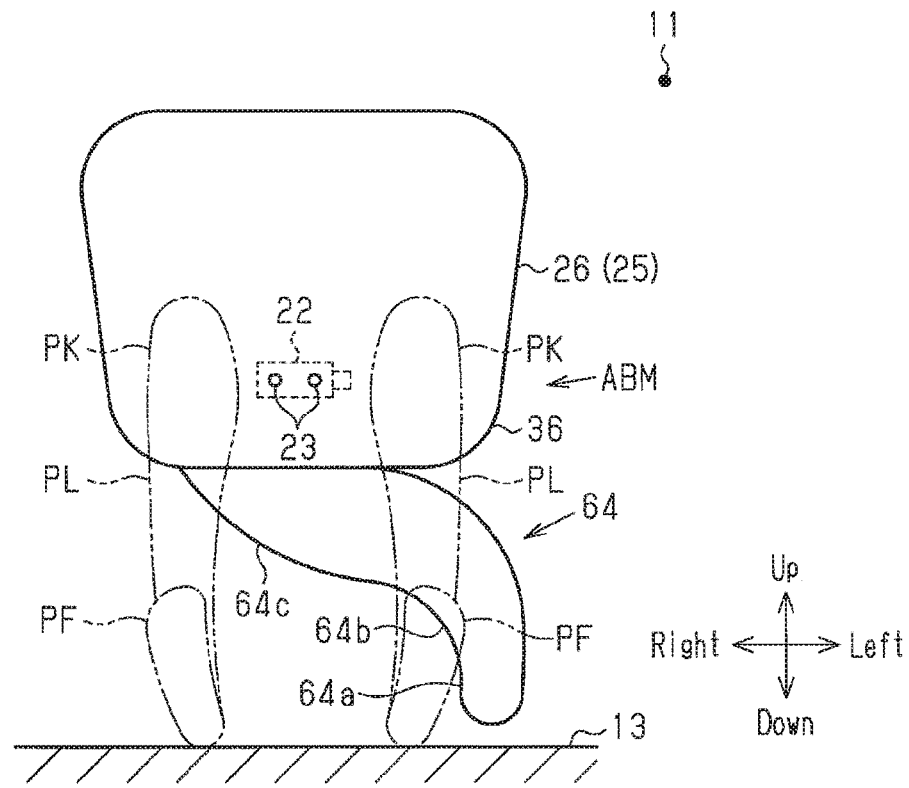
FIG. 5 is a partial front view illustrating how the knees and feet of an occupant are protected from an impact by a knee protection airbag apparatus in accordance with a fourth embodiment.
Figure 6:
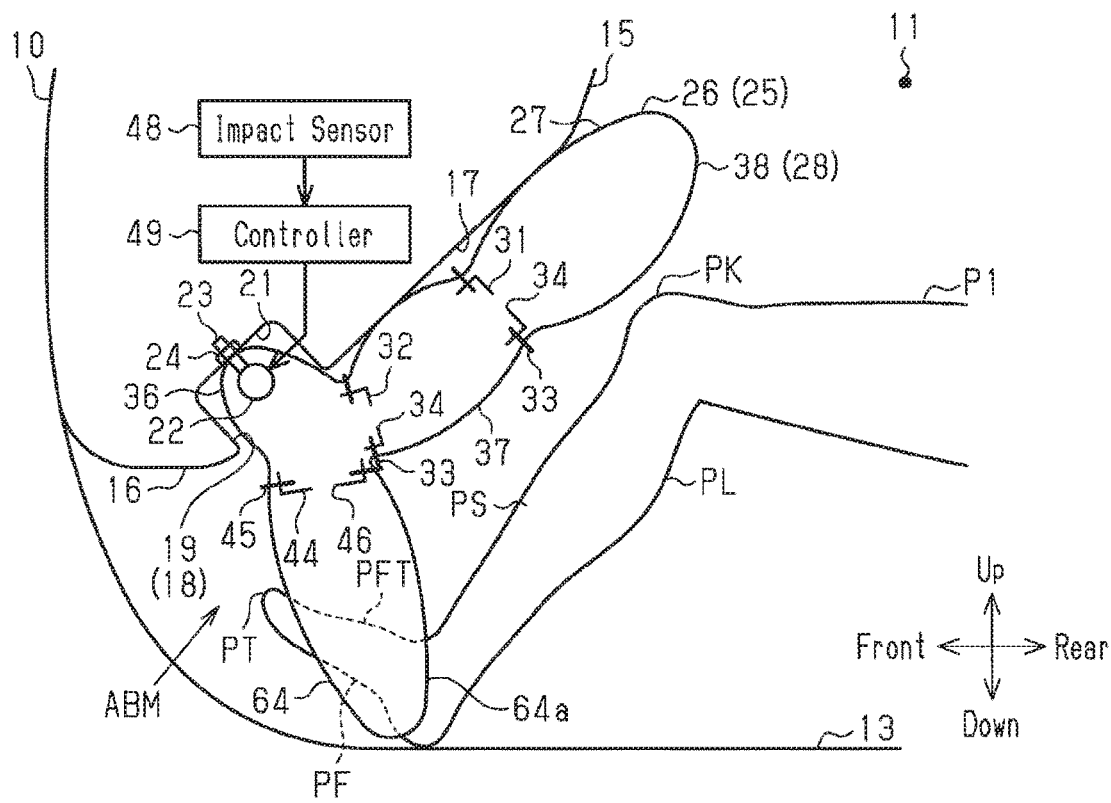
FIG. 6 is a partially cross-sectional side view showing the knee protection airbag apparatus in accordance with the fourth embodiment.

FIG. 5 illustrates an example of a knee protection airbag apparatus of which subject of protection is one of the two legs PL of the occupant, namely, the left leg PL. In this example, the lower end of the lower inflation portion 64 defines the section 64a that is deployed and inflated at a position located adjacent to the left side of the left foot PF. Further, the lower inflation portion 64 includes the section 64b that contacts and presses the instep PFT of the left foot PF at a position located adjacent to the upper right side of the section 64a. The lower end of the lower inflation portion 64 is slightly spaced apart from the floor 13 in an upward direction.

The dimensions of the lower inflation portion 64 in the transverse direction of the vehicle at a part bordering the coupling chamber 36 are set to be approximately the same as or slightly smaller than the dimensions of the coupling chamber 36 in the transverse direction of the vehicle so that the two sections 64a and 64b can be formed to protect the left leg PL and a sufficient amount of inflation gas can be supplied to the two sections 64a and 64b. The lower inflation portion 64 further includes a section 64c that is deployed and inflated in a diagonally lower left direction and located upward from the two sections 64a and 64b. The dimensions of the section 64c in the transverse direction of the vehicle are set to be smaller toward the lower side.

Otherwise, the structure of the fourth embodiment is the same as the second embodiment. Thus, like or the same reference numerals are given to those components that are the same as the corresponding components of the second embodiment. Such components will not be described in detail.

When the vehicle 10 is stopped or slowed by an impact applied to the vehicle 10 from a diagonally frontward direction during a diagonal collision or an offset collision, inertia will act to force the entire body of the occupant P1 in the diagonally frontward direction. This will deploy and inflate the section 64a of the lower inflation portion 64 at a position located adjacent to the left side of the left foot PF to restrain the left foot PF, which is forced in the diagonally left frontward direction, and protect the left foot PF.

In the same manner as the second embodiment, the fourth embodiment increases the capability for restraining the left foot PF with the lower inflation portion 64 by pressing the instep PFT of the left foot PF with the section 64b of the lower inflation portion 64. The left foot PF is also restrained when any one of a frontal collision, a diagonal collision, or an offset collision occurs.

Fifth Embodiment

A knee protection airbag apparatus in accordance with a fifth embodiment will now be described with reference to FIG. 7.

Figure 7:
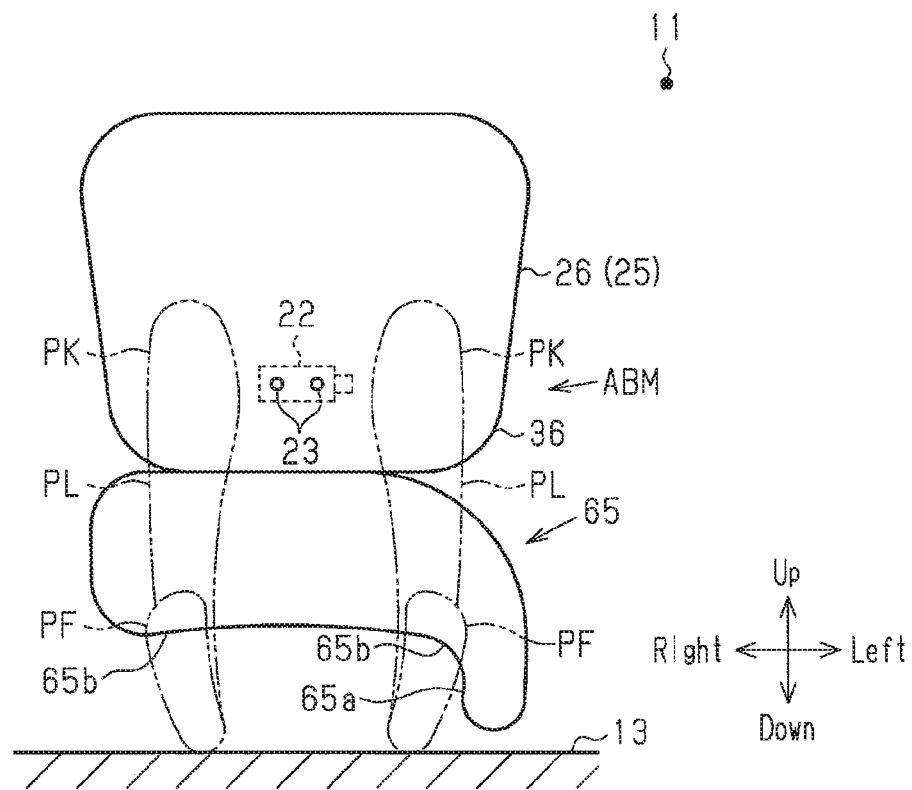
FIG. 7 is a partial front view showing a knee protection airbag apparatus in accordance with a fifth embodiment.

FIG. 7 illustrates an example of a knee protection airbag apparatus of which subject of protection is both left and right legs PL of the occupant P1. In this example, a lower inflation portion 65 protects the left foot PF and the right foot PF through different structures.

In the example shown in FIG. 7, the lower end of the lower inflation portion 65 defines a section 65a that is deployed and inflated at a position located adjacent to the left side of the left foot PF. Further, the lower inflation portion 65 includes a section 65b that contacts and presses the instep PFT of the left foot PF at a position located adjacent to the upper right side of the section 65a. The lower end of the lower inflation portion 65 is slightly spaced apart from the floor 13 in an upward direction. Further, the lower inflation portion 65 includes a section 65b that contacts and presses the instep PFT of the right foot PF. The lower end of the lower inflation portion 65 does not include a section deployed and inflated at a position located adjacent to the right side of the right foot PF.

The dimensions of the lower inflation portion 65 in the transverse direction of the vehicle at the part bordering the coupling chamber 36 are set to be approximately the same as the dimensions of the coupling chamber 36 in the transverse direction of the vehicle so that the lower inflation portion 65 contacts and presses the feet PF from an upper side to protect both of the left and right legs PL. The dimensions of the lower inflation portion 65 in the vertical direction are set so that the portion contacting the instep PFT of the left foot PF is set to be approximately the same as the portion contacting the instep PFT of the right foot PF.

Otherwise, the structure of the fifth embodiment is the same as the fourth embodiment. Thus, like or the same reference numerals are given to those components that are the same as the corresponding components of the fourth embodiment. Such components will not be described in detail.

The fifth embodiment increases the capability for restraining both left and right feet PF when forced in the frontward or diagonally frontward directions by pressing the insteps PFT of the left and right feet PF with the sections 65*b* of the lower inflation portion 65.

Sixth Embodiment

Figure 8:
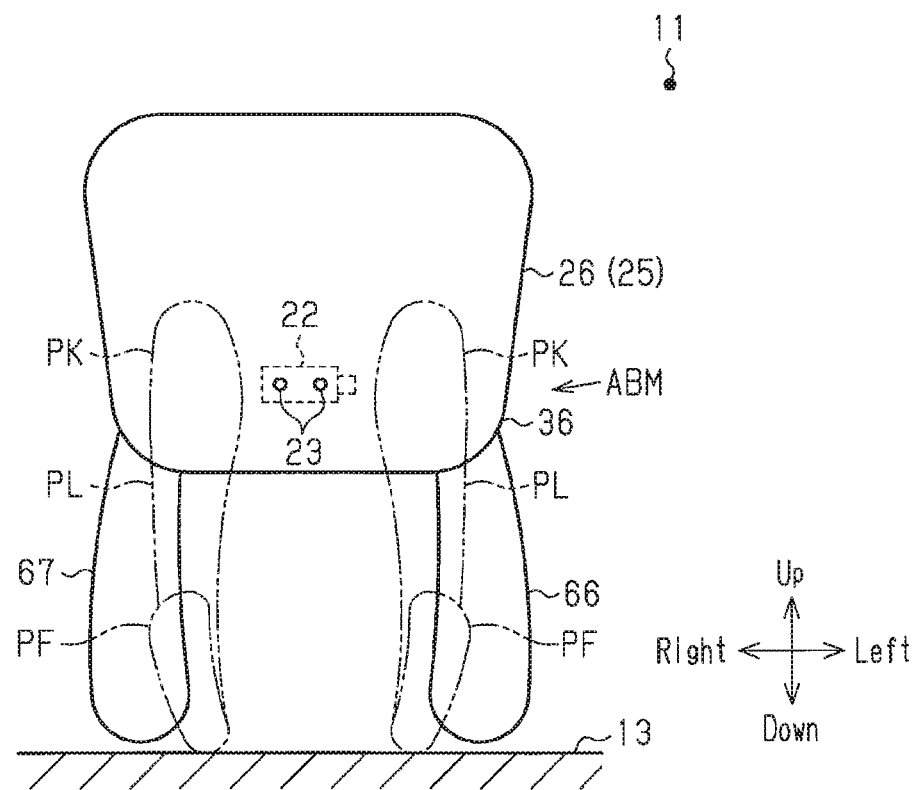
FIG. 8 is a partial front view showing a knee protection airbag apparatus in accordance with a sixth embodiment.
Figure 9:
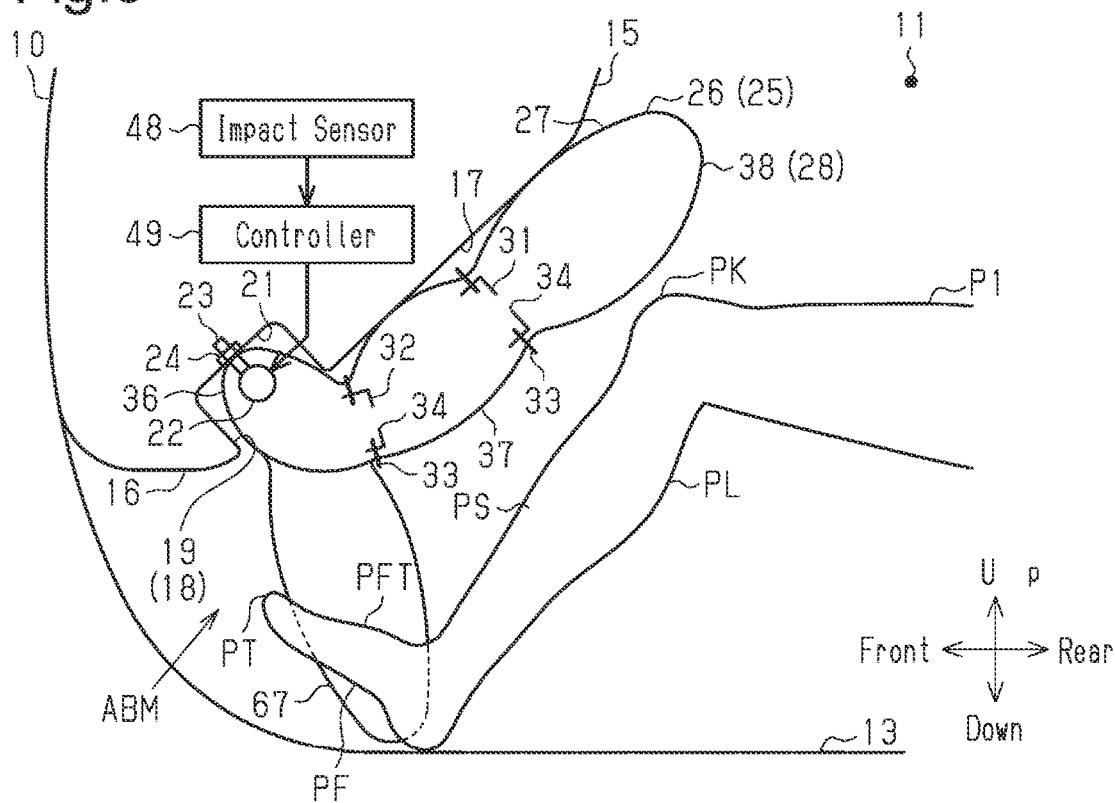
FIG. 9 is a partially cross-sectional side view showing the knee protection airbag apparatus in accordance with the sixth embodiment.

A knee protection airbag apparatus in accordance with a sixth embodiment will now be described with reference to FIGS. 8 and 9.

The subject of protection of the knee protection airbag apparatus is both of the left and right legs PL of the occupant P1. A lower inflation portion includes two lower inflation portions 66 and 67 located at the left and right sides. When deployment and inflation of the airbag 25 are completed, the left lower inflation portion 66 will be extending in a downward direction from a left lower corner of the upper inflation portion 26. Further, the right lower inflation portion 67 will be extending in a downward direction from a right lower corner of the upper inflation portion 26. Each of the lower inflation portions 66 and 67 does not include a section that contacts and presses the instep PFT of the corresponding foot PF.

Otherwise, the structure of the sixth embodiment is the same as the fourth embodiment. Thus, like or the same reference numerals are given to those components that are the same as the corresponding components of the fourth embodiment. Such components will not be described in detail.

In the sixth embodiment, when the vehicle 10 is slowed or stopped by an impact applied to the vehicle 10 from a diagonally frontward direction during a diagonal collision or an offset collision and the feet PF are forced in the diagonally frontward direction, the two lower inflation portions 66 and 67 will he deployed and inflated at locations beside the feet PF. Thus, the lower inflation portions 66 and 67 restrain the feet PF that are forced in the diagonally frontward direction and protect the feet PF from the impact.

In particular, in the sixth embodiment, the two lower inflation portions 66 and 67 are deployed and inflated at positions located at opposite sides of the two feet PF in the transverse direction of the vehicle. Thus, when an impact is applied to the vehicle 10 from a diagonally left frontward direction or from a diagonally right frontward direction, the feet PF that are forced in a diagonally frontward direction are restrained. This protects both feet PF from the impact.

Seventh Embodiment

A knee protection airbag apparatus in accordance with a seventh embodiment will now be described with reference to FIG. 10.

The knee protection airbag apparatus in accordance with the seventh embodiment includes a lower inflation portion 66 of which subject of protection is only one foot PF. FIG. 10 shows a state in which deployment and inflation of the airbag 25 are completed. A shown by the solid lines, the lower inflation portion 66, of which the subject of protection is the left foot PF, extends in a downward direction from a left lower corner of the upper inflation portion 26. In the same manner as the sixth embodiment, the lower inflation portion 66 does not include a section that contacts and presses the instep PFT of the left foot PF.

Otherwise, the structure of the seventh embodiment is the same as the sixth embodiment. Thus, like or the same reference numerals are given to those components that are the same as the corresponding components of the fourth embodiment. Such components will not be described in detail, In the seventh embodiment, when a diagonal collision or an offset collision occurs and an impact applied to the vehicle 10 from a diagonally left frontward direction forces the left foot PF in the diagonally left frontward direction, the lower inflation portion 66 is deployed and inflated at a position located adjacent to the left side of the foot PF. The left foot PF forced in the diagonally left frontward direction is restrained and protected from the impact.

Eighth Embodiment

Figure 11:
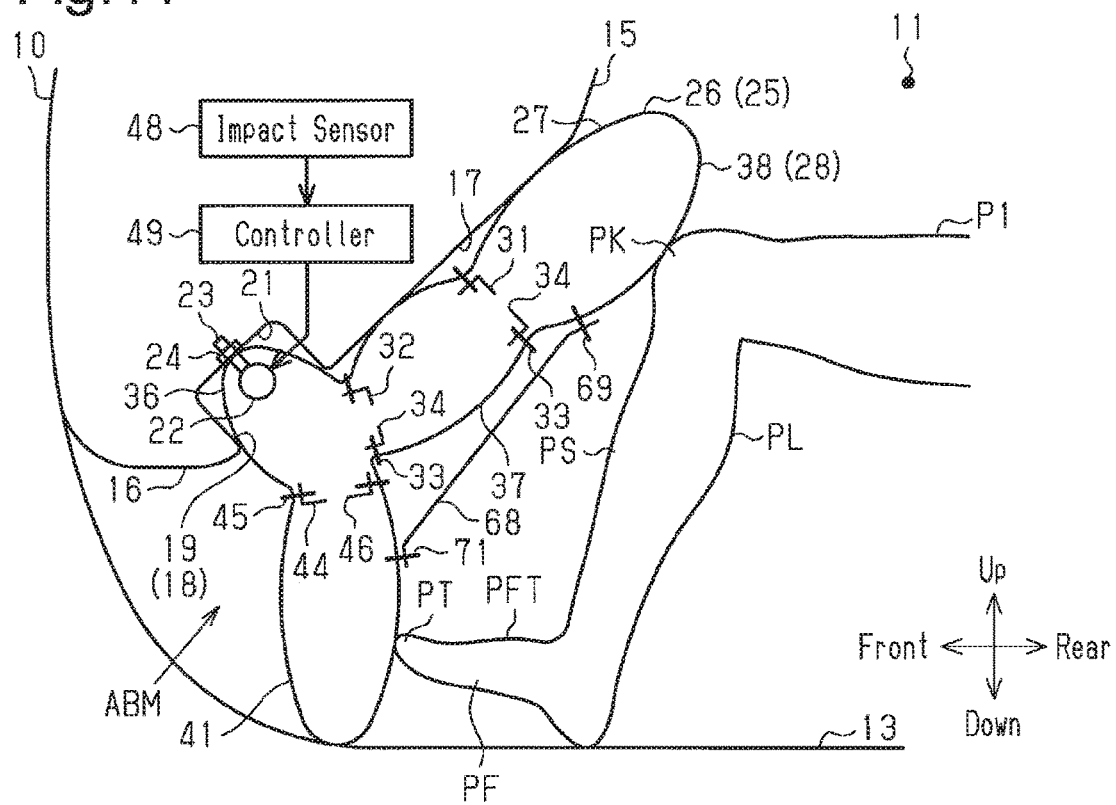
FIG. 11 is a partially cross-sectional side view showing a knee protection airbag apparatus in accordance with an eighth embodiment.

A knee protection airbag apparatus in accordance with an eighth embodiment will now be described with reference to FIG. 11.

The knee protection airbag apparatus in accordance with the eighth embodiment includes an outer rear tether 68 added to the structure of the first embodiment. The outer rear tether 68 is formed by a piece of fabric. When deployment and inflation of the airbag 25 are completed, the outer rear tether 68 will be located rearward from the airbag 25. A joining portion 69 joins the rear upper end of the outer rear tether 68 with the upper inflation portion 26, namely, the upper chamber 38 in the eighth embodiment. A joining portion 71 joins the front lower end of the outer rear tether 68 with the lower inflation portion 41. The outer rear tether 68 connects the upper inflation portion 26 and the lower inflation portion 41.

Otherwise, the structure of the eighth embodiment is the same as the first embodiment. Thus, like or the same reference numerals are given to those components that are the same as the corresponding components of the first embodiment. Such components will not be described in detail.

In the eighth embodiment, the deployed and inflated upper inflation portion 26 is sandwiched between the instrument panel 15 and the knees PK. This restricts movement of the upper inflation portion 26 in the front-rear direction. The deployment and inflation of the airbag 25 pulls and stretches the outer rear tether 68. The lower inflation portion 41 is connected by the outer rear tether 68 to the upper inflation portion 26. The outer rear tether 68 and the upper inflation portion 26 restrict movement of the lower inflation portion 41 in the frontward direction. Thus, the capability for restraining the feet PF, which are forced in the frontward direction, with the lower inflation portion 41 to protect the feet PF from an impact is increased from the first embodiment.

Ninth Embodiment

Figure 12:
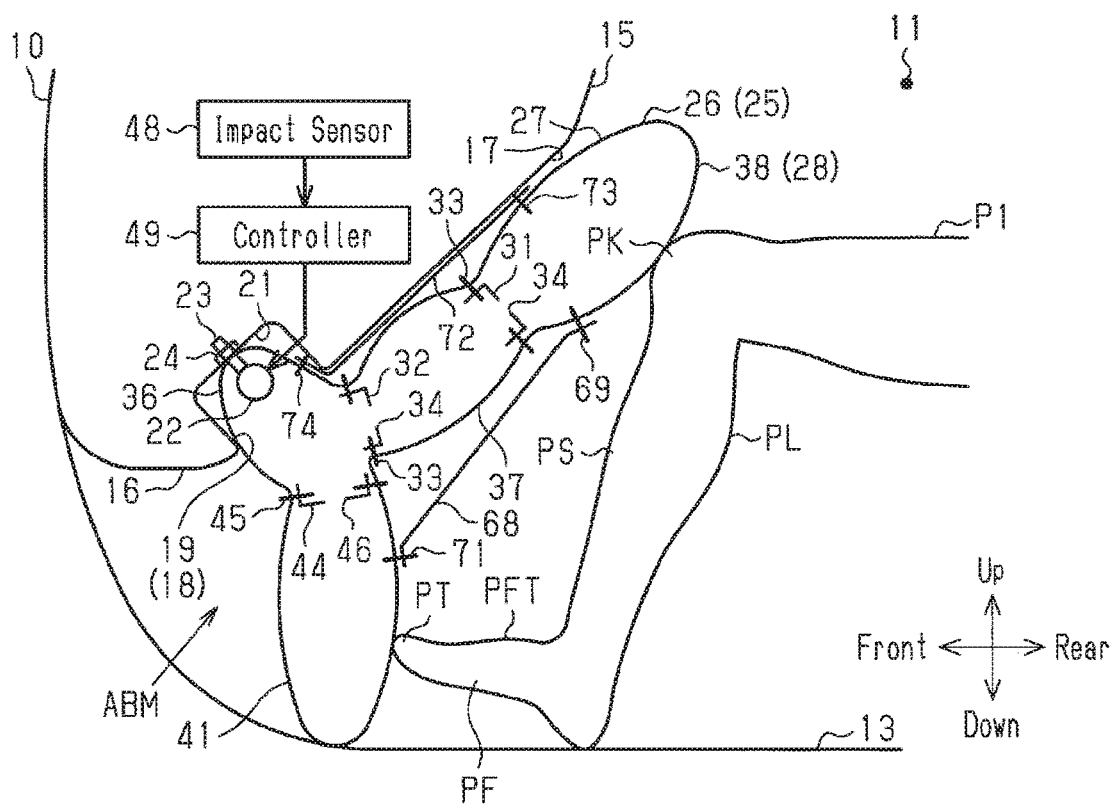
FIG. 12 is a partially cross-sectional side view showing a knee protection airbag apparatus in accordance with a ninth embodiment.

A knee protection airbag apparatus in accordance with a ninth embodiment will now be described with reference to FIG. 12.

The knee protection airbag apparatus in accordance with the ninth embodiment includes an outer front tether 72 added to the structure of the eighth embodiment. The outer front tether 72 is formed by a piece of fabric. When deployment and inflation of the airbag 25 are completed, the outer front tether 72 will be located between the upper inflation portion 26 and the inclined portion 17 of the instrument panel 15. A joining portion 74 joins the front lower end of the outer front tether 72 with the lower part of the upper inflation portion 26, namely, the coupling chamber 36 in the ninth embodiment. A joining portion 73 joins the rear upper end of the outer front tether 72 with a part of the upper inflation portion 26 located upward from the joining portion 74, namely, the upper chamber 38 in the ninth embodiment. In this manner, the outer front tether 72 connects the upper chamber 38 and the coupling chamber 36.

In the ninth embodiment, during deployment and inflation of the airbag 25, the outer front tether 72 is set to be stretched by a stronger tension than the outer rear tether 68. Such a setting is obtained by changing the number of the outer front tether 72 and the outer rear tether 68 or by changing the shape, size, and the like of the outer front tether 72 and the outer rear tether 68.

Otherwise, the structure of the ninth embodiment is the same as the eighth embodiment. Thus, like or the same reference numerals are given to those components that are the same as the corresponding components of the eighth embodiment. Such components will not be described in detail.

In the ninth embodiment, deployment and inflation of the airbag 25 will pull and stretch both of the outer front tether 72 and the outer rear tether 68. When the outer front tether 72 is stretched, a force acts on the upper inflation portion 26 to pull the upper inflation portion 26 in a front upward direction. When the outer rear tether 68 is stretched, a force acts on the lower inflation portion 41 to pull the lower inflation portion 41 in a rear upward direction, while a force acts on the upper inflation portion 26 to pull the upper inflation portion 26 in the front downward direction.

In the ninth embodiment, during deployment and inflation of the airbag 25, the outer front tether 72 is stretched by a stronger tension than the outer rear tether 68. This avoids separation of the upper inflation portion 26 from the rear surface of the instrument panel 15 and restricts movement of the lower inflation portion 41 in a frontward direction. As a result, the capability for restraining the feet PF, which are forced in a frontward direction or a diagonally frontward direction, with the lower inflation portion 41 to protect the feet PF from an impact is increased from the eighth embodiment. In addition, the upper inflation portion 26 deployed and inflated from the holder 18 along the rear surface of the instrument panel 15 in a diagonally rear upward direction increases the capability for protecting the knees PK from an impact from the eighth embodiment.

Tenth Embodiment

Figure 13:
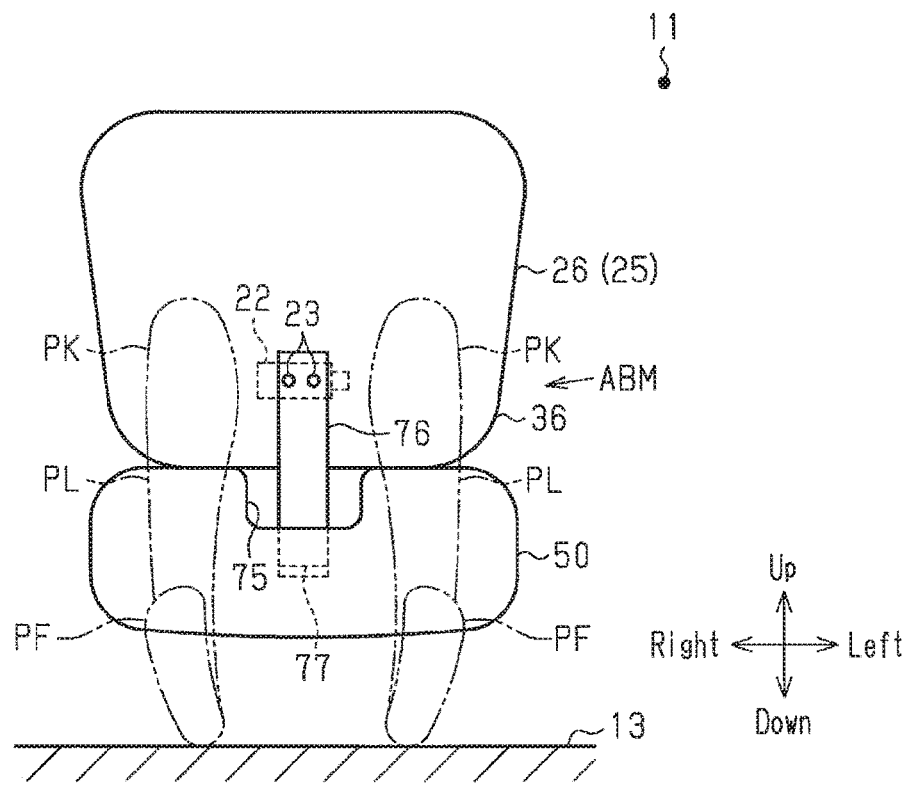
FIG. 13 is a partial front view showing a knee protection airbag apparatus in accordance with a tenth embodiment.
Figure 14:
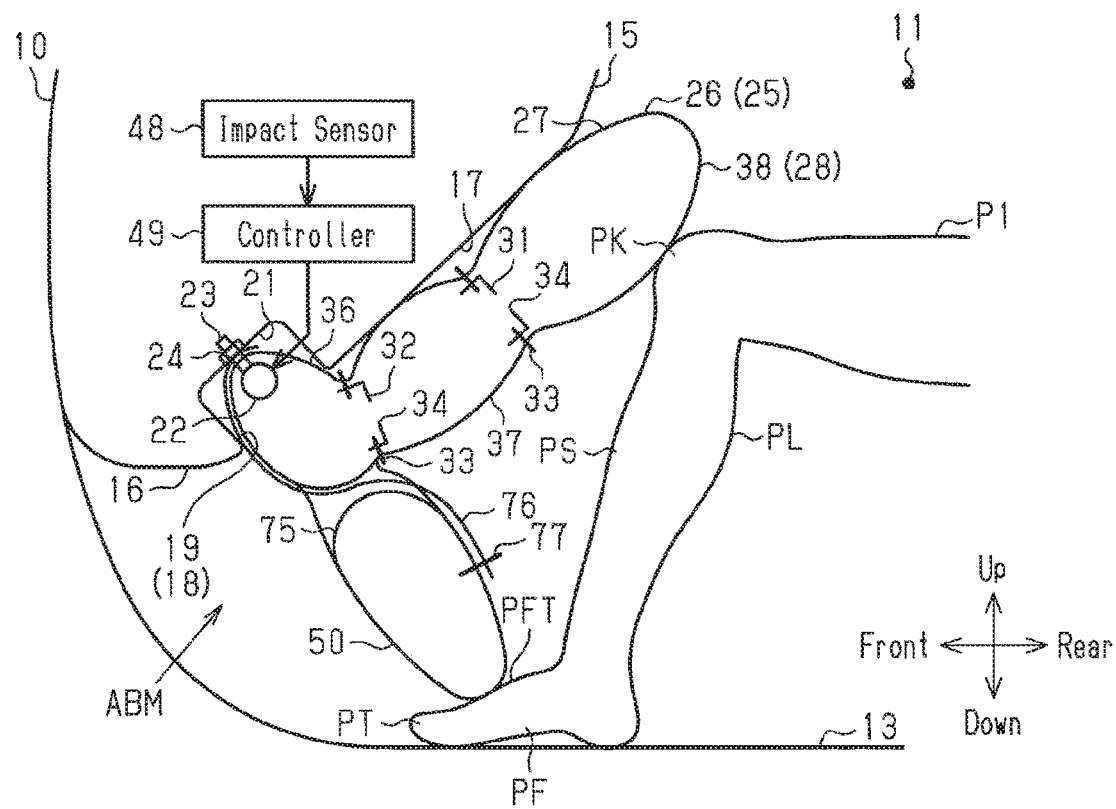
FIG. 14 is a partially cross-sectional side view showing the knee protection airbag apparatus in accordance with the tenth embodiment.
Figure 15:
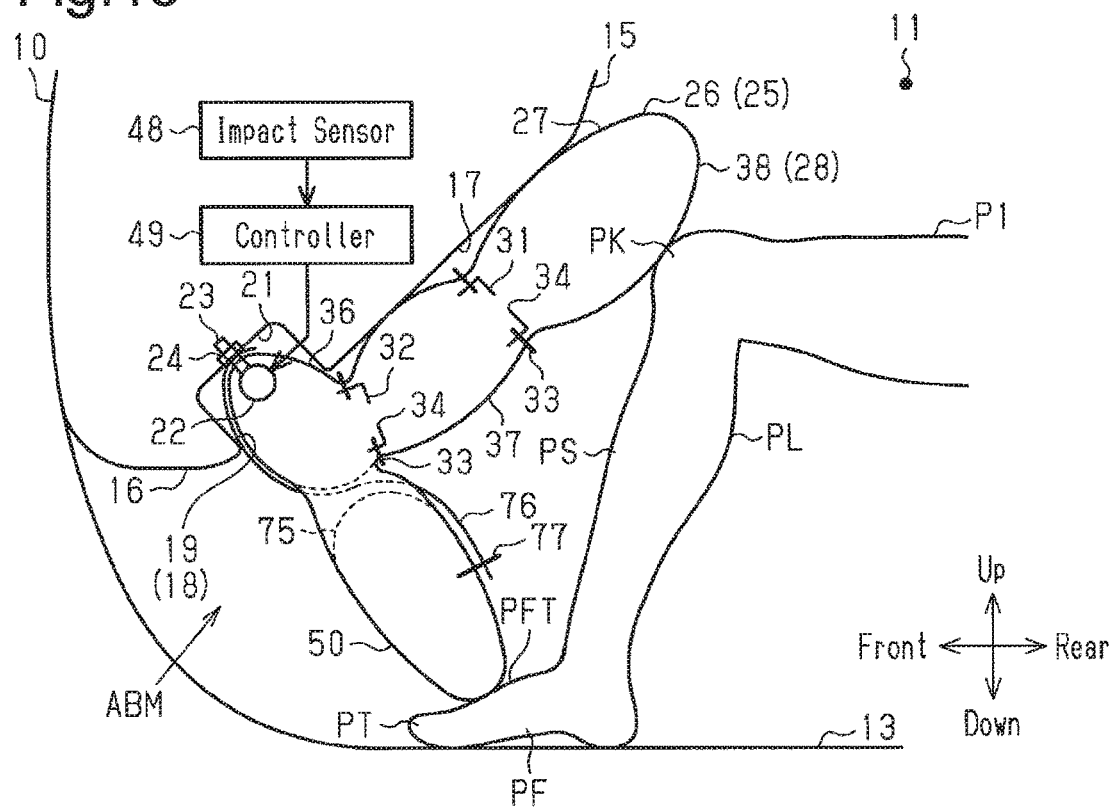
FIG. 15 is a partially cross-sectional side view showing the knee protection airbag apparatus in accordance with the tenth embodiment taken along a plane that differs from that of FIG. 14.

A knee protection airbag apparatus in accordance with a tenth embodiment will now be described with reference to FIGS. 13 to 15.

The knee protection airbag apparatus in accordance with the tenth embodiment basically has the same structure as the second embodiment. The tenth embodiment differs from the second embodiment in that movement of the lower inflation portion 50 in a frontward direction or a diagonally frontward direction is restricted when pressed by the feet PF that are forced in the frontward direction or the diagonally frontward direction.

A slot 75 extends through the airbag 25 in the front-rear direction at a bordering part of the upper inflation portion 26 and the lower inflation portion 50 when deployment and inflation of the airbag 25 are completed. As shown in FIGS. 13 to 15, the slot 75 is formed in the upper part of the lower inflation portion 50 bordering the upper inflation portion 26.

An outer tether 76 formed by a strip of fabric is inserted through the slot 75. The outer tether 76 includes a portion located in the upper frontward direction from the slot 75 and arranged over a region extending from a lower part to a front part of the coupling chamber 36 in the upper inflation portion 26. Further, the outer tether 76 includes a portion located in the lower rearward direction from the slot 75 and arranged along the rear part of the lower inflation portion 50.

The outer tether 76 also includes a front upper end held by the bolts 23 of the gas generator 22. The bolts 23 are inserted through the upper end of the outer tether 76 to hold the front upper end. The outer tether 76 includes a front upper end fixed to the holder 18 together with the gas generator 22 and the coupling chamber 36 by fastening the gas generator 22 to the bottom wall 21 of the holder 18 with the nuts 24 and the bolts 23.

A joining portion 77 joins a rear lower end of the outer tether 76 with a rear part of the lower inflation portion 50 at a position located downward from the slot 75.

Otherwise, the structure of the tenth embodiment is the same as the second embodiment. Thus, like or the same reference numerals are given to those components that are the same as the corresponding components of the second embodiment. Such components will not be described in detail.

In the tenth embodiment, deployment and inflation of the airbag 25 will pull and stretch the outer tether 76. The front upper end of the outer tether 76 is fixed to the holder 18. When the outer tether 76 is stretched, a force acts on the lower inflation portion 50 in a diagonally rear upward direction. The outer tether 76 restricts movement of the lower inflation portion 50 in a front downward direction. Thus, the capability for restraining the feet PF, which are forced in a frontward direction or a diagonally frontward direction, with the lower inflation portion 50 to protect the feet PF from an impact is increased from the second embodiment.

Eleventh Embodiment

Figure 16:
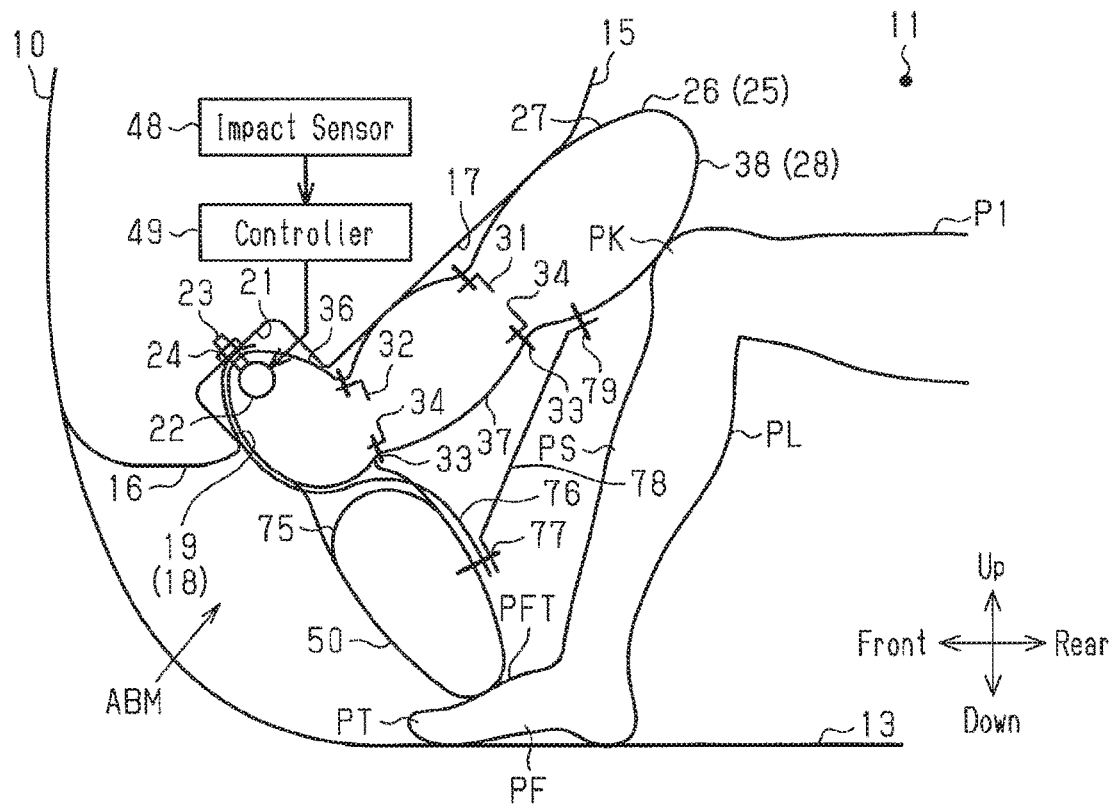
FIG. 16 is a partially cross-sectional side view showing a knee protection airbag apparatus in accordance with an eleventh embodiment.

A knee protection airbag apparatus in accordance with an eleventh embodiment will now be described with reference to FIG. 16.

The knee protection airbag apparatus in accordance with the eleventh embodiment includes an outer rear tether 78 added to the structure of the tenth embodiment. The outer rear tether 78 has the same structure as the outer rear tether 68 of the eighth embodiment. When deployment and inflation of the airbag 25 are completed, the outer rear tether 78 of the eleventh embodiment, which is formed by a piece of fabric substantially extending in the vertical direction, will be located rearward from the airbag 25. A joining portion 79 joins the rear upper end of the outer rear tether 78 with the upper part of the upper inflation portion 26, namely, the upper chamber 38 in the eleventh embodiment. Further, a joining portion joins the front lower end of the outer rear tether 78 with the lower inflation portion 50. In the eleventh embodiment, the joining portion 77, which joins the rear lower end of the outer tether 76 with the lower inflation portion 50, is used to join the front lower end of the outer rear tether 78 with the lower inflation portion 50. However, a joining portion separate from the joining portion 77 may be used to join the front lower end with the lower inflation portion 50. The outer rear tether 78 connects the upper inflation portion 26 and the lower inflation portion 50.

Otherwise, the structure of the eleventh embodiment is the same as the tenth embodiment. Thus, like or the same reference numerals are given to those components that are the same as the corresponding components of the tenth embodiment. Such components will not be described in detail.

In the eleventh embodiment, deployment and inflation of the airbag 25 will pull and stretch the outer tether 76 and the outer rear tether 78. When the outer rear tether 78 is stretched, a force acts to pull the lower inflation portion 50 in a rear upward direction. This increases the force acting to restrict movement of the lower inflation portion 50 in the frontward direction from that of the tenth embodiment. Thus, the capability for restraining the feet PF, which are forced in a frontward direction or a diagonally frontward direction, with the lower inflation portion 50 to protect the feet PF from an impact is increased from the tenth embodiment.

The embodiments may be modified as described below. The above embodiments and the modifications described below can be combined as long as there is no contradiction in the combination.

Modifications to First to Eleventh Embodiments

The holder 18 may be arranged in the instrument panel 15 in front of the legs PL of the occupant P1 seated in the front passenger seat or in front of the legs PL of the occupant P1 seated in the driver seat.

The upper inflation portion 26 may be partitioned into multiple chambers by a number of partitions that differs from the above embodiments.

Under the condition that the airbag 25 includes the upper inflation portion 26 and one of the lower inflation portions 41, 50, and 64 to 67, the airbag 25 may include a further inflation portion.

Further, the airbag 25 may include a non-inflation portion that is not supplied with inflation gas and not inflated.

The number of the connection holes 34, 46, 51, 56, and 63 in the partitions 31, 32, 44, 54, and 59 and the inner tether 52 may be one or more.

The vehicle 10 to which the knee protection airbag apparatus is applied is not limited to automobiles and includes various types of industrial vehicles.

The controller 49 may be changed to a configuration that outputs an activation signal to the gas generator 22 when application of an impact to the vehicle 10 from a frontward direction or a diagonally frontward direction is predicted.

Modifications to First, Third, Eighth, and Ninth Embodiments

The lower end of the lower inflation portion 41 may contact the floor 13 without pressing the floor 13. The lower end of the lower inflation portion 41 may be spaced apart from the floor 13 in an upward direction under the condition that the lower end is located at a lower position than the insteps PFT of the feet PF.

This structure is more effective than when there is no lower inflation portion and will restrain the feet PF and protect the feet PF from an impact even though it may not be as effective as when the lower end of the lower inflation portion 41 contacts and presses the floor 13.

Figure 17:
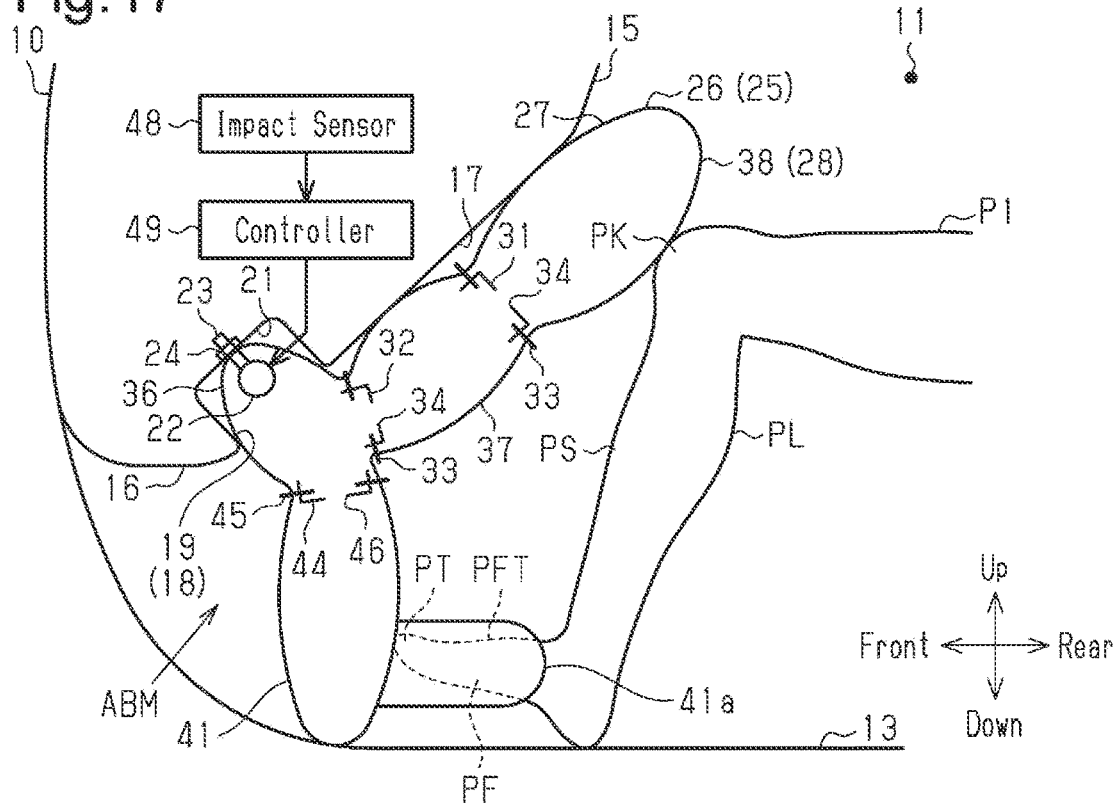
FIG. 17 is a modified form of the construction of FIG. 2 in accordance with the first embodiment.

As shown in FIG. 17, a section 41a that is deployed and inflated at a position adjacent to one foot PF in the transverse direction of the vehicle may be connected to the lower inflation portion 41. In this case, the section 41a restrains the foot PF that is forced in the diagonally frontward direction and protects the foot PF from an impact.

Modifications to Fourth and Fifth Embodiments

The subject of protection of the knee protection airbag apparatus may be the right leg PL of the occupant P1. In this case, when deployment and inflation of the airbag 25 are completed, the section 64a of the lower inflation portion 64 and the section 65a of the lower inflation portion 65 will be located at a position adjacent to the right side of the right foot PF of the occupant P1. Further, the sections 64b and 65b contact and press the instep PFT of the right foot PF.

The subject of protection of the lower inflation portions 64 and 65 may be both feet PF of the occupant P1. In this case, the lower inflation portions 64 and 65 will include the sections 64a and 65a at positions located at opposite sides of the two feet PF in the transverse direction of the vehicle.

Modifications to Sixth and Seventh Embodiments

At least one of the lower inflation portions 66 and 67 may be deployed and inflated so that its lower end contacts and presses the floor 13. This produces friction between the floor 13 and the inflated one of the lower inflation portions 66 and 67 and limits movement of the inflated one of the lower inflation portions 66 and 67 in a diagonally frontward direction. This will restrain the feet PF, which are forced in a diagonally frontward direction, and further increase the capability for protecting the feet PF.

Modifications to Tenth and Eleventh Embodiments

The slot 75 may be located in the lower part of the upper inflation portion 26 at the border with the lower inflation portion 50. Alternatively, a slot may extend over both of the upper inflation portion 26 and the lower inflation portion 50.

The structures of the tenth and eleventh embodiments may be applied to the first, third, eighth, and ninth embodiments in which the lower inflation portion is deployed and inflated in front of the toes PT.

The structures of the tenth and eleventh embodiments may be applied to the fourth and fifth embodiments in which the lower inflation portion is deployed and inflated beside the feet PF in the transverse direction of the vehicle.

Modifications to Seventh Embodiment

Figure 10:
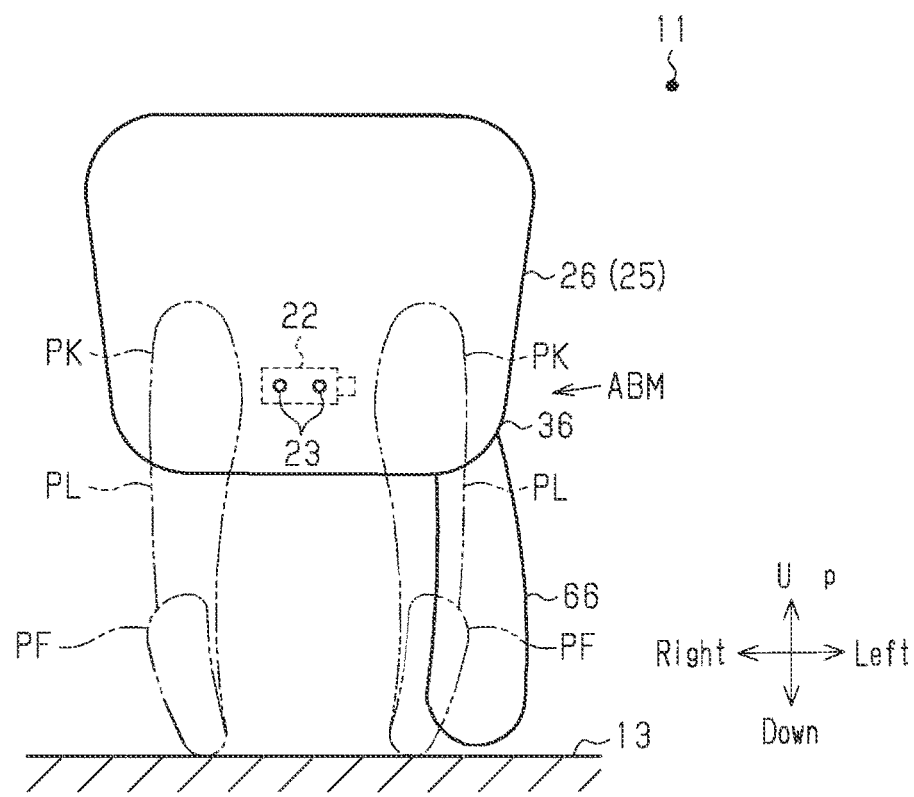
FIG. 10 is a partial front view showing a knee protection airbag apparatus in accordance with a seventh embodiment.
Figure 18:
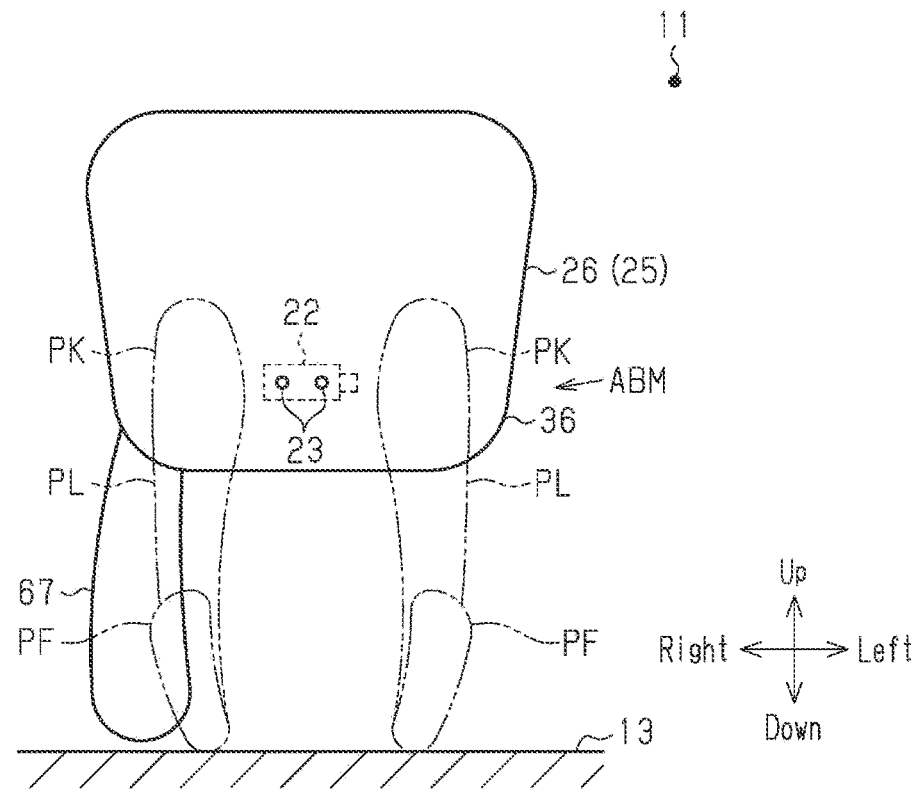
FIG. 18 is a modified form of the construction of FIG. 10 in accordance with the seventh embodiment.

As shown in FIG. 18, the lower inflation portion 66 of the seventh embodiment of FIG. 10 may be replaced by a lower inflation portion 67 that is deployed and inflated in the downward direction from the right lower corner of the upper inflation portion 26.

In this case, when a diagonal collision or an offset collision occurs and an impact applied to the vehicle 10 from a diagonally right frontward direction forces the right foot PF in the diagonally right frontward direction, the lower inflation portion 67 is deployed and inflated at a position located adjacent to the right side of the right foot PF. Thus, the lower inflation portion 67 restrains the right foot PF that is forced in the diagonally right frontward direction and protects the feet PF from the impact.

Modifications to Eighth Embodiment

The outer rear tether 68 of the eighth embodiment is applicable to the second to seventh embodiments.

Modifications to Eleventh Embodiment

The outer front tether 72 similar to that of the ninth embodiment may be used in the eleventh embodiment. In this case, the outer front tether 72 is located between the upper inflation portion 26 and the instrument panel 15 to connect the lower part of the upper inflation portion 26 and a part of the upper inflation portion 26 located upward from the lower part.

The outer front tether 72 limits separation of the upper inflation portion 26 from the rear surface of the instrument panel 15 and restricts movement of the lower inflation portion 41 in a frontward direction. As a result, the capability for restraining the feet PF, which are forced in a frontward direction or a diagonally frontward direction, with the lower inflation portion 41 to protect the feet PF from an impact may be further increased.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A knee protection airbag apparatus, comprising:
an airbag configured to be accommodated in a holder arranged in an instrument panel of a vehicle, wherein the knee protection airbag apparatus is configured to deploy and inflate the airbag with inflation gas between the holder and a leg of an occupant seated in a front seat of the vehicle, the airbag including:
an upper inflation portion configured to be deployed and inflated from the holder along a rear surface of the instrument panel in a rear upward direction to protect a knee of the leg of the occupant; and
a lower inflation portion configured to be deployed and inflated from the holder in a downward direction or a diagonally rear downward direction such that a lower end of the lower inflation portion reaches a position where the lower end contacts an instep of a foot of the leg of the occupant or a position lower than the instep to protect the foot of the occupant,
wherein the knee protection airbag apparatus further comprises an outer rear tether located rearward from the airbag and connecting the upper inflation portion and the lower inflation portion.

2. The knee protection airbag apparatus according to claim 1, wherein the lower inflation portion is configured to be deployed and inflated in front of a toe of the foot of the occupant.

3. The knee protection airbag apparatus according to claim 2, wherein the lower end of the lower inflation portion is configured to contact and press a floor of a passenger compartment of the vehicle from an upper side.

4. The knee protection airbag apparatus according to claim 1, wherein the lower inflation portion includes a section configured to be deployed and inflated at a position adjacent to one foot in a transverse direction of the vehicle.

5. The knee protection airbag apparatus according to claim 1, wherein the lower end of the lower inflation portion is configured to contact and press the instep of the foot from an upper side.

6. The knee protection airbag apparatus according to claim 1, further comprising an outer front tether located between the upper inflation portion and the instrument panel and connecting a lower part of the upper inflation portion and a part of the upper inflation portion located upward from the lower part.

7. A knee protection airbag apparatus, comprising:
an airbag configured to be accommodated in a holder arranged in an instrument panel of a vehicle, wherein the knee protection airbag apparatus is configured to deploy and inflate the airbag with inflation gas between the holder and a leg of an occupant seated in a front seat of the vehicle, the airbag including:
an upper inflation portion configured to be deployed and inflated from the holder along a rear surface of the instrument panel in a rear upward direction to protect a knee of the leg of the occupant; and
a lower inflation portion configured to be deployed and inflated from the holder in a downward direction or a diagonally rear downward direction such that a lower end of the lower inflation portion reaches a position where the lower end contacts an instep of a foot of the leg of the occupant or a position lower than the instep to protect the foot of the occupant; and
a slot extending through the airbag in a front-rear direction at a bordering part of the upper inflation portion and the lower inflation portion,
wherein the knee protection airbag apparatus further comprises an outer tether inserted through the slot and arranged along the airbag, wherein
the outer tether includes a rear lower end joined with a rear part of the lower inflation portion at a position located downward from the slot, and
the outer tether includes a front upper end joined with the holder.

* * * * *